United States Patent
Zhou et al.

(10) Patent No.: US 7,479,805 B1
(45) Date of Patent: Jan. 20, 2009

(54) PROGRAMMABLE DIFFERENTIAL SIGNALING SYSTEM

(75) Inventors: Shi-dong Zhou, Milpitas, CA (US); Gubo Huang, Milpitas, CA (US); Andy T. Nguyen, San Jose, CA (US); Ronald L. Cline, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 11/888,790

(22) Filed: Aug. 1, 2007

Related U.S. Application Data

(62) Division of application No. 11/067,422, filed on Feb. 25, 2005, now Pat. No. 7,265,586.

(51) Int. Cl.
*H03K 19/0175* (2006.01)
(52) U.S. Cl. .......................................... 326/83; 326/87
(58) Field of Classification Search .................. 326/26, 326/27, 82–87
See application file for complete search history.

(56) References Cited

U.S. PATENT DOCUMENTS

| | | | |
|---|---|---|---|
| 6,788,116 B1 | 9/2004 | Cook et al. | |
| 6,812,734 B1 * | 11/2004 | Shumarayev et al. | 326/30 |
| 6,856,178 B1 * | 2/2005 | Narayan | 327/108 |
| 6,867,618 B2 | 3/2005 | Li et al. | |
| 6,943,588 B1 | 9/2005 | Luo et al. | |
| 6,956,401 B1 | 10/2005 | Tyhach et al. | |
| 6,977,534 B2 * | 12/2005 | Radelinow | 327/112 |
| 7,190,193 B1 | 3/2007 | Ross | |
| 7,265,586 B1 | 9/2007 | Zhou et al. | |

\* cited by examiner

*Primary Examiner*—Don P Le
(74) *Attorney, Agent, or Firm*—Timothy W. Markison; Michael R. Hardaway

(57) ABSTRACT

A programmable differential signaling system includes a programmable bias generator and a plurality of input/output modules. The programmable bias generator is operably coupled to generate a first global bias signal and a second global signal based on desired signal properties of one of a plurality of differential signaling conventions. The a plurality of input/output modules is operably coupled to convert between differential signaling and single ended signaling, wherein actual signal properties of the differential signaling are regulated based on the first and second global bias signals to substantially equal the desired signal properties.

4 Claims, 13 Drawing Sheets

LVDS driver 54

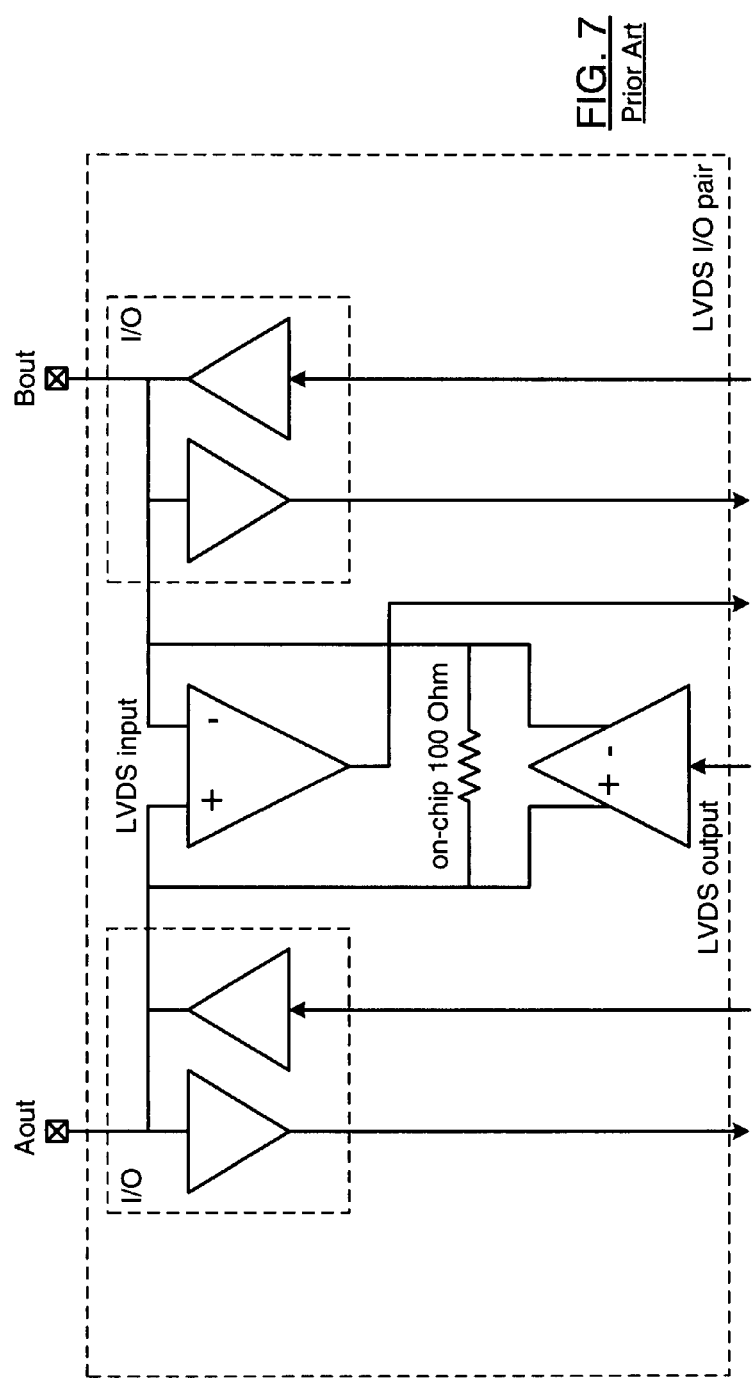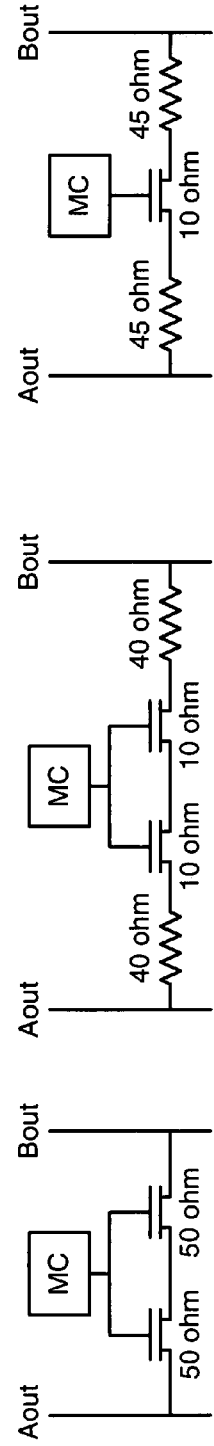
FIG. 7
Prior Art
FIG. 8
Prior Art
FIG. 9
Prior Art programmable differential signaling system 10

LVDS driver 54

I/O module 14 - 20

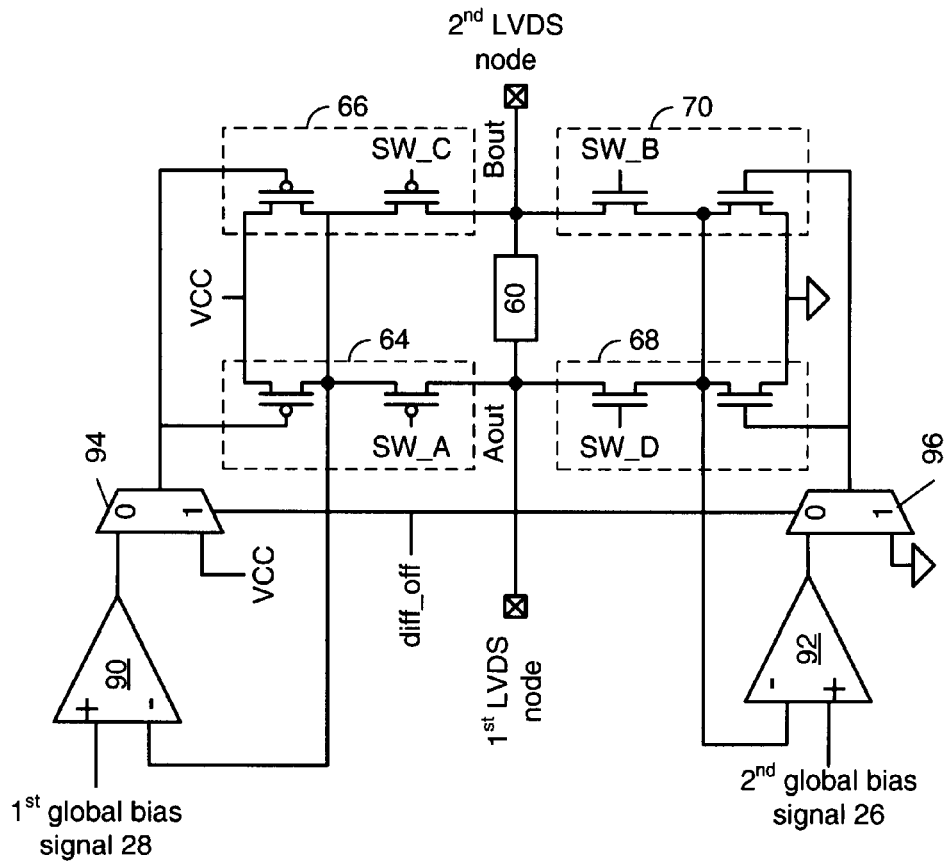
FIG. 16 LVDS driver 54
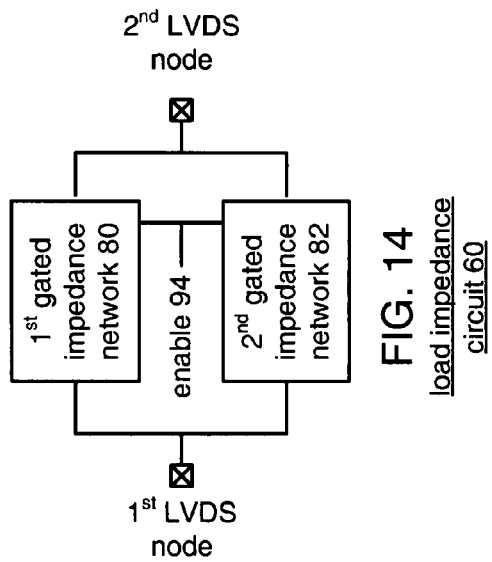
FIG. 14 load impedance circuit 60
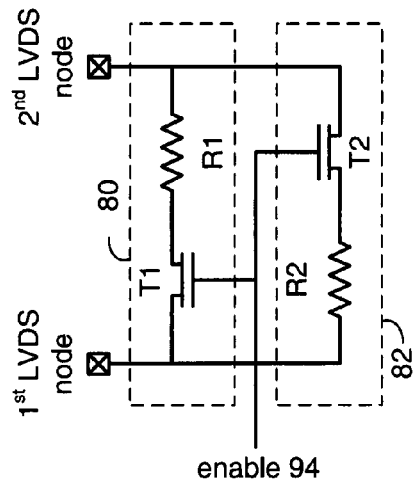
FIG. 15 load impedance circuit 60

LVDS driver 54 programmable bias generator 12

1st and 2nd programmable biasing modules 100 and 102

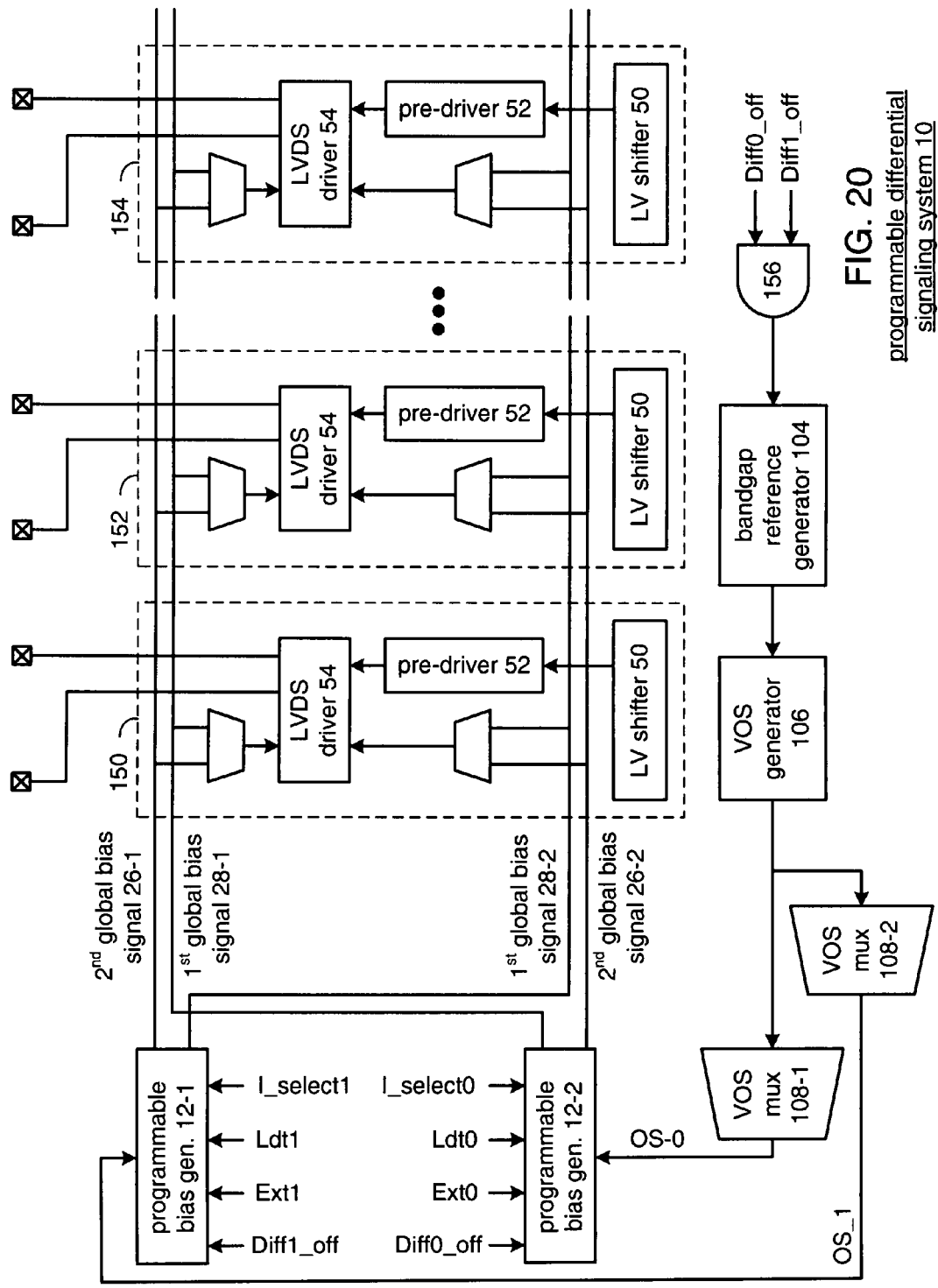

PROGRAMMABLE DIFFERENTIAL SIGNALING SYSTEM

BACKGROUND OF THE INVENTION

1. Technical Field of the Invention

This invention relates generally to data communication and more particularly to data transmissions.

2. Description of Related Art

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that provides various high data rate protocols, including one for 10 gigabits per second. In accordance with such standards, many system components and end user devices of a communication system transport data via serial transmission paths. Internally, however, the system components and end user devices process data in a parallel manner. As such, each system component and end user device converts parallel data into serial data and transmits the serial data to another device with negligible, or recoverable, loss of information.

To facilitate the transmission of serial data, each of the system components and user devices includes an output signaling convention. For instance, many devices use a low voltage complimentary metal oxide semiconductor (LVCMOS) input/output (I/O) standard that inputs and outputs signals that swing from rail to rail (e.g., from 0 volts to a supply voltage). Such an I/O implementation was used because it was simple to implement and it reliable transferred data. However, it did so at relatively slow data rates (e.g., less than approximately 300 MHz).

More recently, system components and/or user devices are using an I/O standard called Low Volt Differential Swing (LVDS), which can transfer data up to 10 GHz. In general, an LVDS serial interface achieves the high data rates because LVDS outputs swing only a couple hundreds milli-Volts (mV) and cross each other as shown in FIG. 1. As is further shown in FIG. 1, an LVDS signal includes two primary parameters: Vod and Vos. Vod is the different between 2 LVDS outputs: Aout and Bout; and Vos is the average level of the two outputs.

As with most signaling conventions, there are variations of the basic concept. For instance, the following table includes several different implementations of the low voltage differential swing signaling convention.

|    |      | DC       |      |          |       |
|----|------|----------|------|----------|-------|
|    |      | Vod (mV) |      | Vos (V)  |       |
|    |      | Min      | Max  | Min      | Max   |
| DC | LVDS | 247      | 454  | 1.125    | 1.375 |
|    | RSDS | 100      | 400  | 1.100    | 1.500 |
|    | MINI | 300      | 600  | 1.000    | 1.400 |
|    | LDT  | 495      | 715  | 0.495    | 0.715 |

FIG. 2 illustrates a prior art embodiment of a LVDS based transmitter of an I/O module that may perform in accordance with one of the above LVDS signaling conventions. In this embodiment, the transmitter includes a pre-driver and an LVDS driver. As shown, the pre-driver receives an input signal (IN) and provides four switching signals (SW_A, SW_B, SW_C, and SW_C) to the LVDS driver. The LVDS driver produces the LVDS output (Aout, Bout) based on the four switching signals.

FIG. 3 is a schematic block diagram of the LVDS driver of FIG. 2 driving an LVDS input of another device. In this illustration, the LVDS driver is on one chip (i.e., integrated circuit) and the LVDS input is on another chip. The chips and a pair of 50 Ohm resistors are on a printed circuit board.

In this embodiment, Vos is determined by the equilibrium of pull up and pull down of the current sources and switches of the LVDS driver. For example, a stronger pull up than pull down raises Vos and a weaker pull up than pull down lowers Vos. In addition, Vod is determined by the current supplied by the pull up current source (I_PU) or the current supplied by the pull down current source (I_PD) divided by 2 and then multiply by 100 Ohm. Accordingly, to maintain an accurate LVDS signaling, the pull up circuitry needs to substantially match the pull down circuitry, which, in a CMOS process, is extremely difficult. Further, this embodiment only conforms to one of the versions of LVDS signaling conventions.

One prior art embodiment to provide a circuit that accommodates multiple LVDS signaling conventions is shown in FIG. 4. In this prior art embodiment, a global control module provides control signals (PUonb_0, PUonb_1, PUonb_n, PDonb_0, PDonb_1, PDonb_n) to each of the LVDS drivers based on the selected signal convention. Typically, the control signals are stored in memory. As shown, each of the LVDS drivers includes switches and 50 Ohm resistors as shown in FIG. 3 and further includes a plurality of P-channel transistors and N-channel transistors. The P-channel and N-channel transistors are enabled/disabled based on the control signals to implement the desired LVDS signaling convention.

In this embodiment, the pull up current and pull down current are determined by the number of P-channel transistors and N-channel transistors that are enabled. The transistors may be enabled in the active region and/or linear region of operation to establish the currents. While this is a relatively simple implementation to achieve a single circuit that accommodates multiple signaling conventions, it requires memory space and, if implemented in a CMOS process, the pull up current and pull down currents may differ to the point of failing the specified values of Vos and Vod. Further, Vos and Vod may be adversely affected by variations and/or noise on VCC and ground.

FIG. 5 illustrates another prior art embodiment of an LVDS driver that accommodates multiple signaling conventions. In this embodiment, the LVDS driver includes a plurality of parallel switches to control the pull up and pull down currents.

Accordingly, each of the signaling conventions is achieved by enabling a predetermined number of switches (A and B) or (C and D) to generate the appropriate currents, which, in turn, establishes Vos & Vod. Note that, the global control module stores the switching states for the switches for each of the signaling conventions.

While this is also a relatively simple implementation to achieve a single circuit that accommodates multiple signaling conventions, it requires more memory space than the embodiment of FIG. 4. In addition, if implemented in a CMOS process, the pull up current and pull down currents may differ to the point of failing the specified values of Vos and Vod. Further, Vos and Vod may be adversely affected by variations and/or noise on VCC and ground.

FIG. 6 is another embodiment of a single LVDS driver that can accommodate multiple signaling conventions that combines the features of both FIGS. 4 and 5. While this embodiment allows finer tuning of the signal conventions than the embodiments of FIGS. 4 and 5, it still suffers from the adverse affects of a CMOS implementation and variations and/or noise on VCC and ground. Further, because it includes a combination of FIGS. 4 and 5, it requires more memory.

FIGS. 7, 8 and 9 are schematic diagrams of various embodiments of a 100 Ohm circuit that can be disconnected. In FIG. 7, the 100 Ohms is achieved via transistors since they are more cost effective than using poly resistors. However, the resistance values of the transistors vary considerably more than poly-resistors and makes it difficult to consistently achieve 100 Ohms.

The embodiments of FIGS. 8 and 9 include a combination of poly-resistors and transistors. This reduces the variation caused by the transistor only implementation by the ratio of resistor impedance to transistor impedance. For instance, the ratio of the embodiment of FIG. 8 is 1:4 and the ratio of the embodiment of FIG. 9 is 1:9.

Further, U.S. Pat. No. 6,788,116 teaches further embodiments of LVDS drivers.

While the above has described numerous improvements in LVDS drivers, there exists a need for improvement in Vos and Vod accuracy.

BRIEF SUMMARY OF THE INVENTION

The programmable differential signaling system of the present invention substantially meets these needs and others. In one embodiment, a programmable differential signaling system includes a programmable bias generator and a plurality of input/output modules. The programmable bias generator is operably coupled to generate a first global bias signal and a second global signal based on desired signal properties of one of a plurality of differential signaling conventions. The a plurality of input/output modules is operably coupled to convert between differential signaling and single ended signaling, wherein actual signal properties of the differential signaling are regulated based on the first and second global bias signals to substantially equal the desired signal properties.

In another embodiment, a low voltage differential signal (LVDS) driver includes a first LVDS node, a second LVDS node, a load impedance circuit, and a switching circuit. The load impedance circuit is operably coupled between the first and second LVDS nodes. The switching circuit is operably coupled to provide a differential signal at the first and second LVDS nodes in accordance with an input signal, wherein the switching circuit includes a plurality of current controlled switching transistor circuits.

In another embodiment, a low voltage differential signal (LVDS) impedance circuit includes a first node, a second node, a first gated impedance network, and a second gated impedance network. The first gated impedance network is operably coupled to the first and second nodes. The second gated impedance network is operably coupled in parallel with the first gated impedance, wherein, when active, a parallel combination of the first and second gated impedance networks establishes impedance of the LVDS impedance circuit.

BRIEF DESCRIPTION OF THE SEVERAL VIEWS OF THE DRAWINGS

FIG. 7 is a schematic block diagram of a prior art LVDS resistance impedance circuit;

FIG. 8 is a schematic block diagram of another prior art embodiment of an LVDS impedance circuit;

FIG. 9 is a schematic block diagram of yet another prior art embodiment of an LVDS impedance circuit;

FIG. 14 is a schematic block diagram of a load impedance circuit in accordance with the present invention;

FIG. 15 is a schematic diagram of another load impedance circuit in accordance with the present invention;

FIG. 16 is a schematic block diagram of another embodiment of an LVDS driver in accordance with the present invention;

FIG. 20 is a schematic block diagram of another embodiment of a programmable differential signaling system in accordance with the present invention.

DETAILED DESCRIPTION OF THE INVENTION

Figure 10:
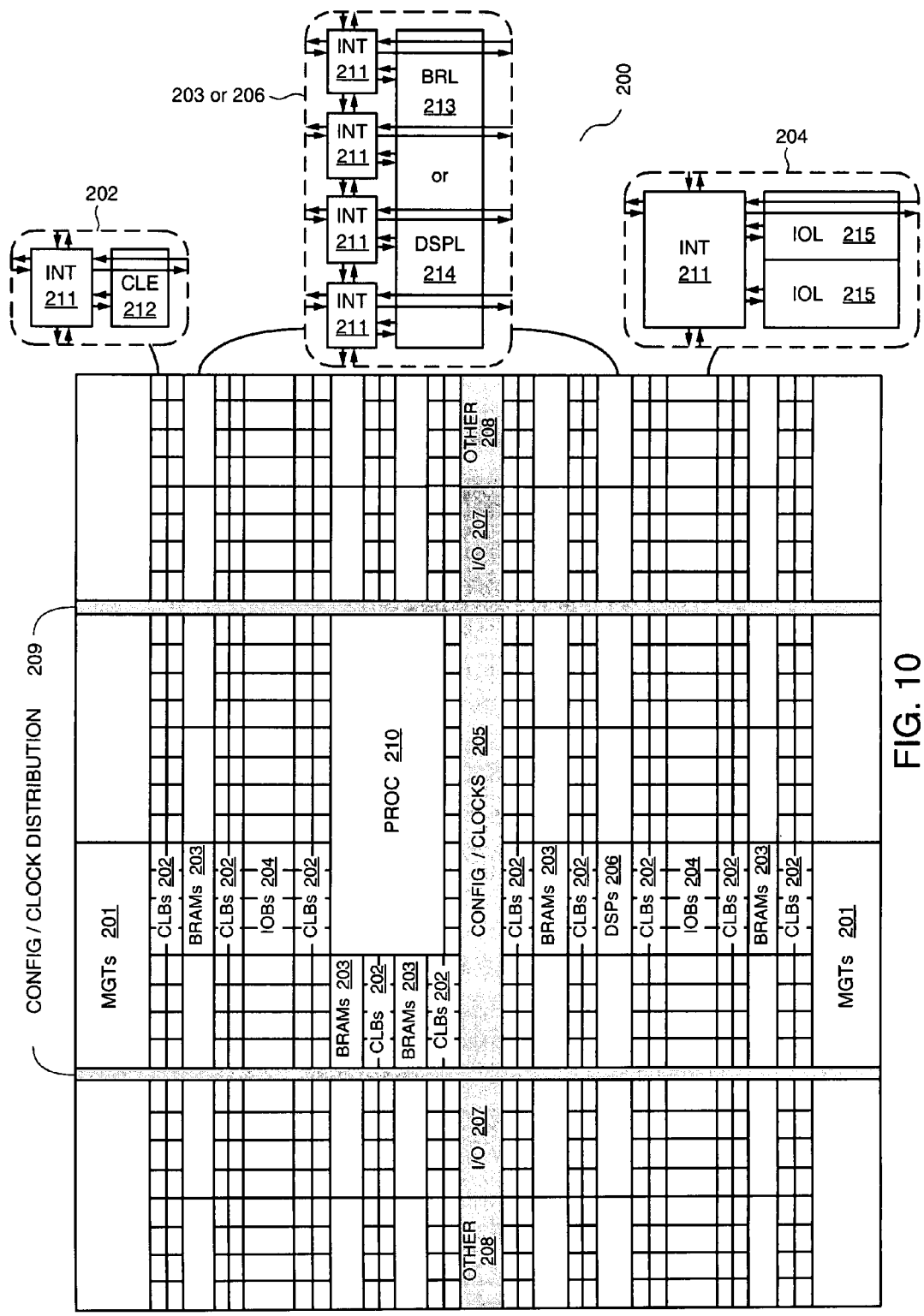
FIG. 10 is a schematic block diagram of a programmable logic device in accordance with the present invention.

FIG. 10 illustrates an FPGA architecture 200 that includes a large number of different programmable tiles including multi-gigabit transceivers (MGTs 201), configurable logic blocks (CLBs 202), random access memory blocks (BRAMs 203), input/output blocks (IOBs 204), configuration and clocking logic (CONFIG/CLOCKS 205), digital signal processing blocks (DSPs 206), specialized input/output blocks (I/O 207) (e.g., configuration ports and clock ports), and other programmable logic 208 such as digital clock managers, analog-to-digital converters, system monitoring logic, and so forth. Some FPGAs also include dedicated processor blocks (PROC 210).

In some FPGAs, each programmable tile includes a programmable interconnect element (INT 211) having standardized connections to and from a corresponding interconnect element in each adjacent tile. Therefore, the programmable interconnect elements taken together implement the programmable interconnect structure for the illustrated FPGA. The programmable interconnect element (INT 211) also includes the connections to and from the programmable logic element within the same tile, as shown by the examples included at the top of FIG. 10.

For example, a CLB 202 can include a configurable logic element (CLE 212) that can be programmed to implement user logic plus a single programmable interconnect element (INT 211). A BRAM 203 can include a BRAM logic element (BRL 213) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 206 can include a DSP logic element (DSPL 214) in addition to an appropriate number of programmable interconnect elements. An IOB 204 can include, for example, two instances of an input/output logic element (IOL 215) in addition to one instance of the programmable interconnect element (INT 211). As will be clear to those of skill in the art, the actual I/O pads connected, for example, to the I/O logic element 215 are manufactured using metal layered above the various illustrated logic blocks, and typically are not confined to the area of the input/output logic element 215.

In the pictured embodiment, a columnar area near the center of the die (shown shaded in FIG. 10) is used for configuration, clock, and other control logic. Horizontal areas 209 extending from this column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, the processor block PROC 210 shown in FIG. 10 spans several columns of CLBs and BRAMs.

Note that FIG. 10 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual FPGA more than one adjacent column of CLBs is typically included wherever the CLBs appear, to facilitate the efficient implementation of user logic.

Figure 11:
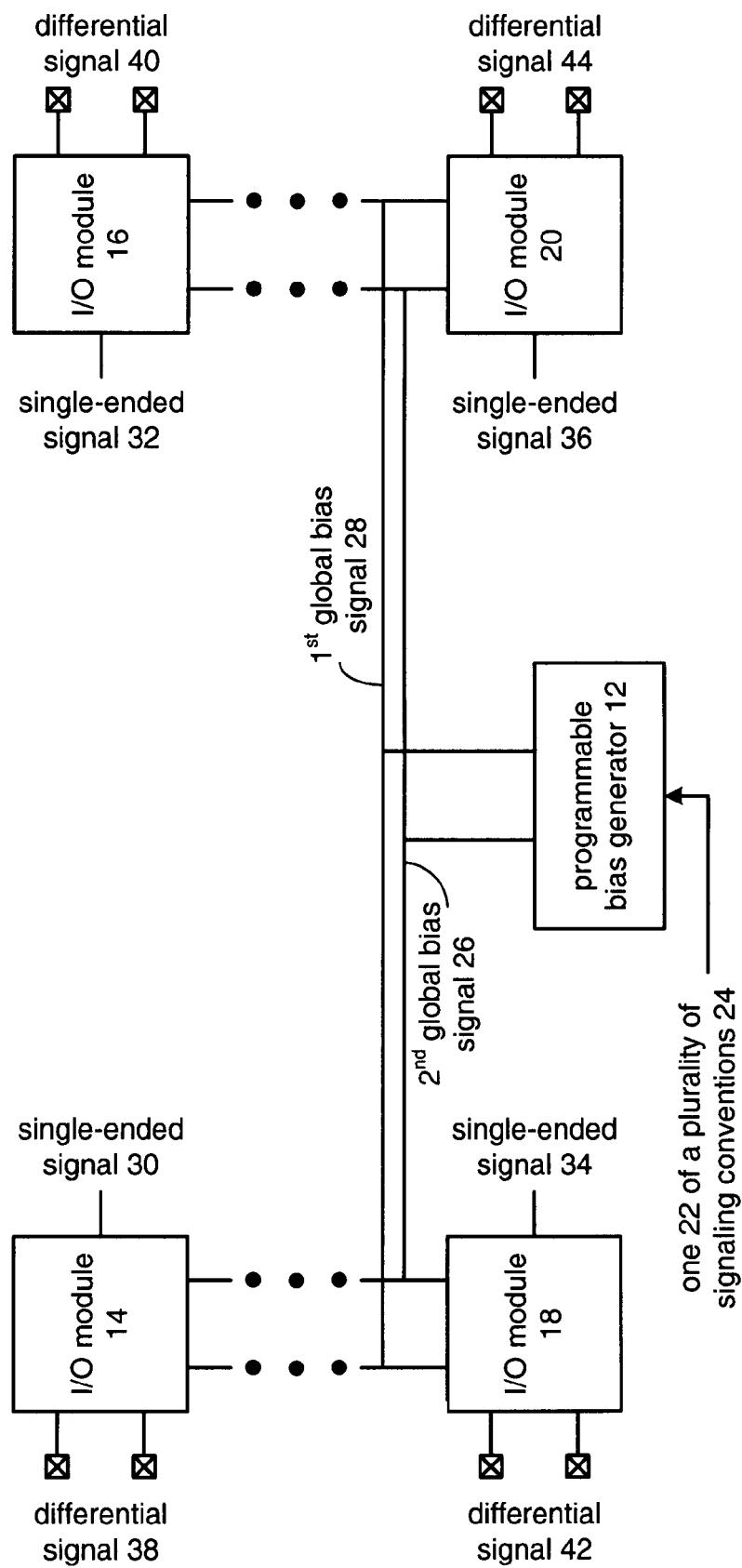
FIG. 11 is a schematic block diagram of a programmable differential signaling system in accordance with the present invention.

FIG. 11 is a schematic block diagram of a programmable differential signaling system 10 that includes a programmable bias generator 12 and a plurality of input/output (I/O) modules 14-20. In general, the programmable bias generator 12 is operably coupled to generate a $1^{st}$ global bias signal 28 and a $2^{nd}$ global bias signal 26 based on desired signaling properties (e.g., VOS, VOD, et cetera) of one of a plurality of differential signaling conventions (e.g., LVDS, RSDS, MINI, LTD). Each of the plurality of input modules is operably coupled to convert between differential signals 38-44 and single-ended signals 30-34 in accordance with the $1^{st}$ and $2^{nd}$ global biasing signals 28 and 26. In this manner, the input/output modules 14-20 produce actual signaling properties (e.g., VOS, VOD, et cetera) in accordance with the desired signaling properties as identified via the selected signal convention.

As one of ordinary skill in the art will appreciate, the programmable differential signaling module 10 may be included in the MGT module of FIG. 10, or in any high-speed serial interface device. Further, as one of ordinary skill in the art will appreciate the plurality of signaling conventions 24 may include more versions of low voltage differential swing (LVDS) signaling beyond the LVDS, RSDS, MINI and LTD wherein the selected one 22 is one of the plurality of signaling conventions 24.

Figure 12:
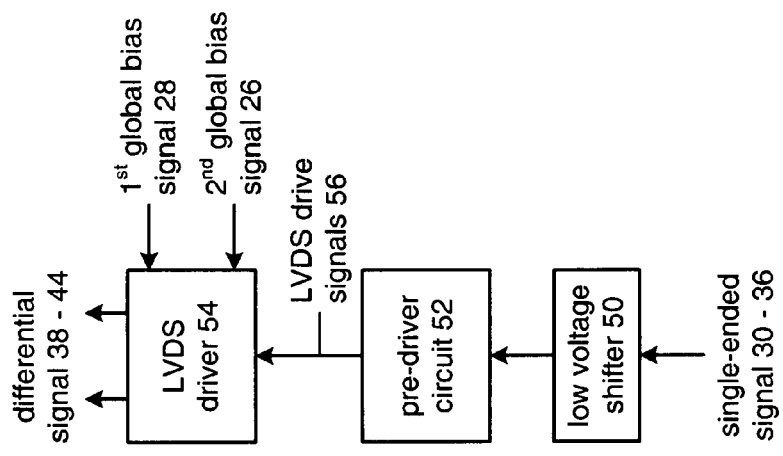
FIG. 12 is a schematic block diagram of an I/O module in accordance with the present invention.

FIG. 12 is a schematic block diagram of an embodiment of the I/O modules 14-20 that includes a low voltage shifter 50, a pre-driver circuit 52 and an LVDS driver 54. The low voltage shifter is operably coupled to receive the single-ended signals 30-36 and adjust the voltage level of the signal 30-36.

Figure 1:
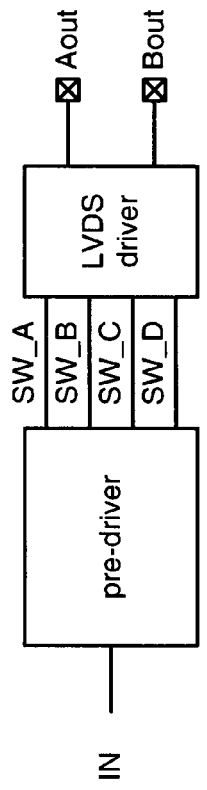
FIG. 1 is a prior art diagram of LVDS signaling.
Figure 2:
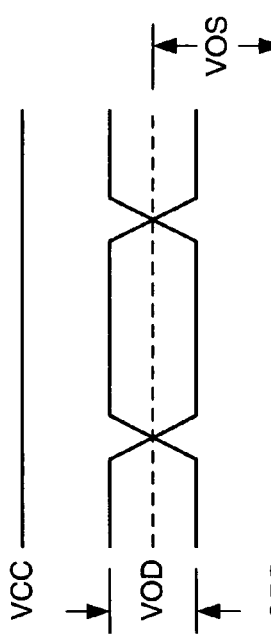
FIG. 2 is a schematic block diagram of a prior art LVDS circuit.
Figure 3:
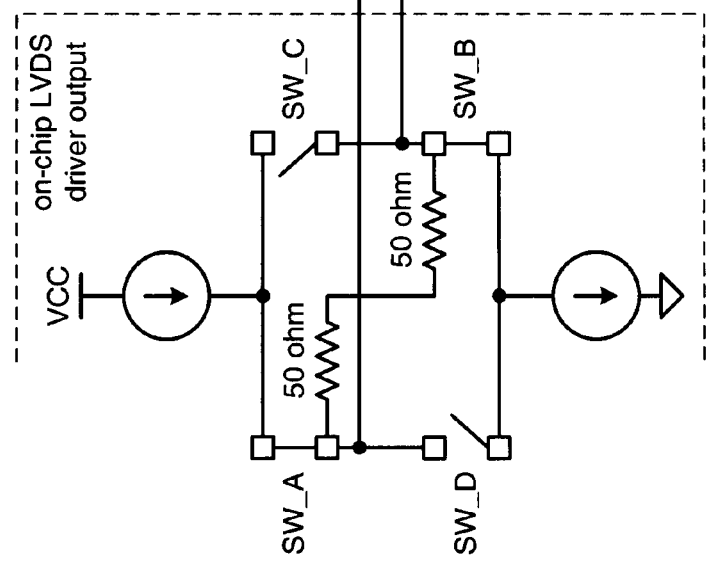
FIG. 3 is a schematic block diagram of a prior art on-chip LVDS driver output.
Figure 4:
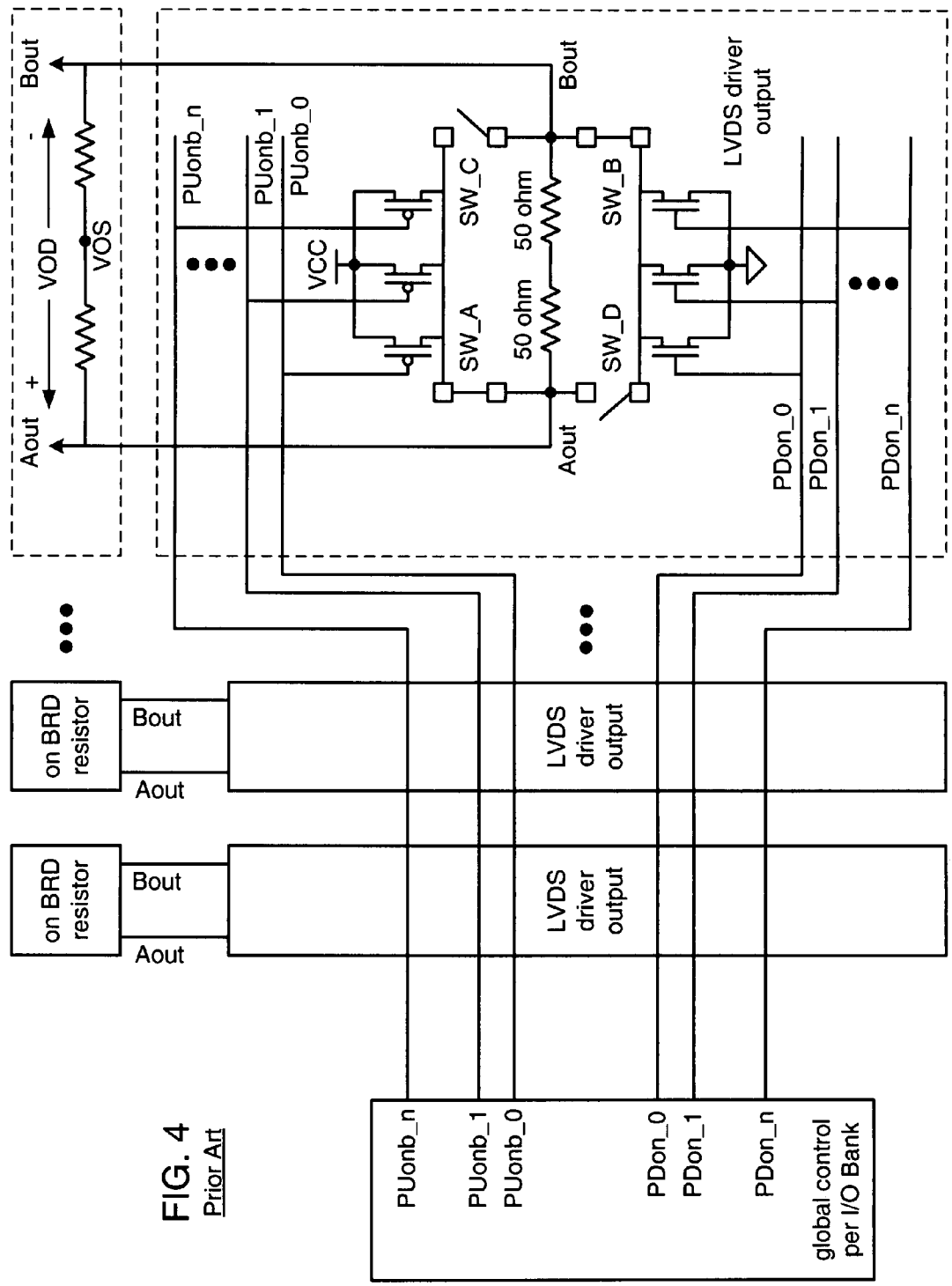
FIG. 4 is a schematic block diagram of a prior art transmission circuit with LVDS driver outputs.
Figure 5:
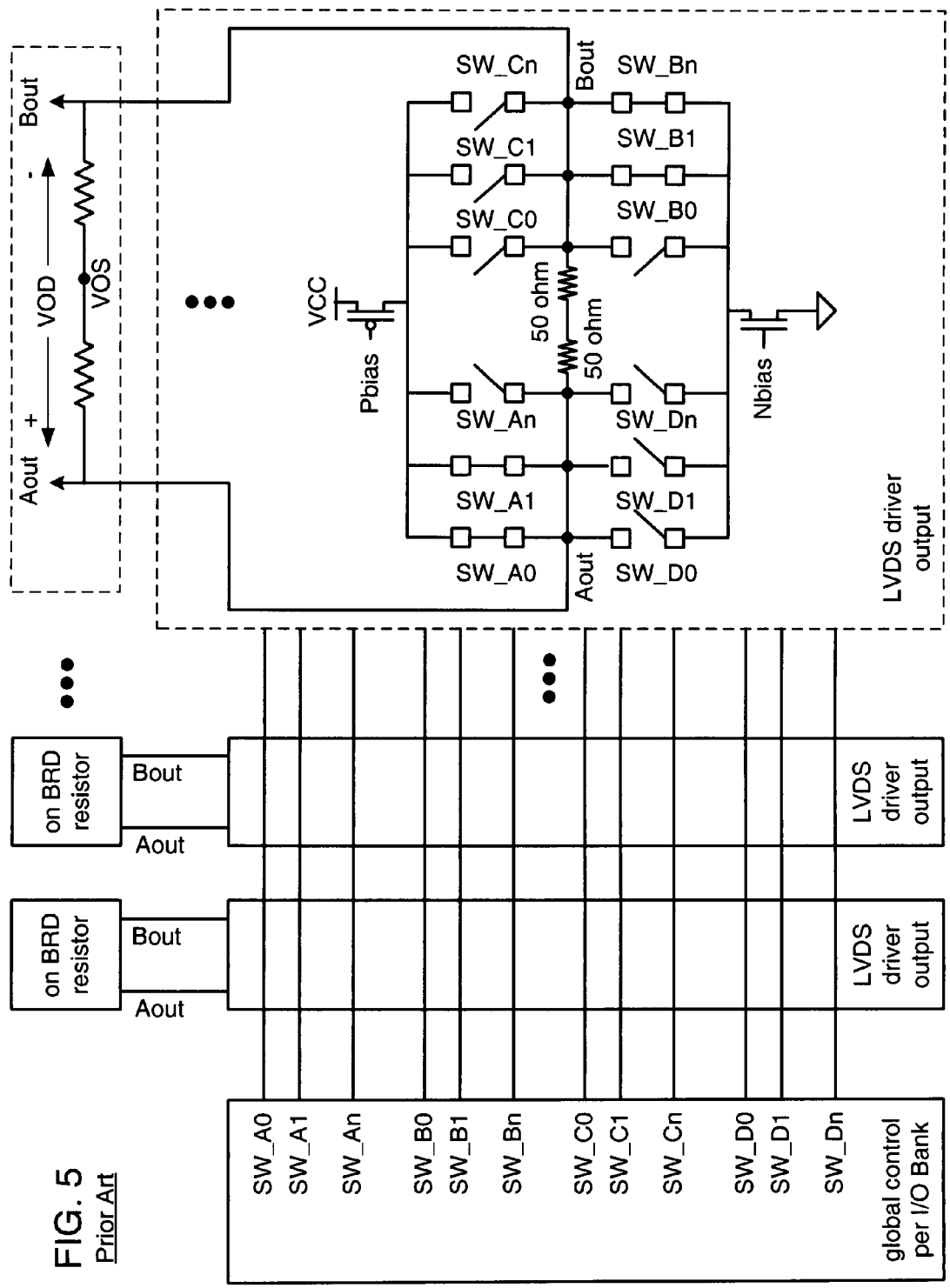
FIG. 5 is a schematic block diagram of another prior art transmission system including LVDS driver outputs.
Figure 6:
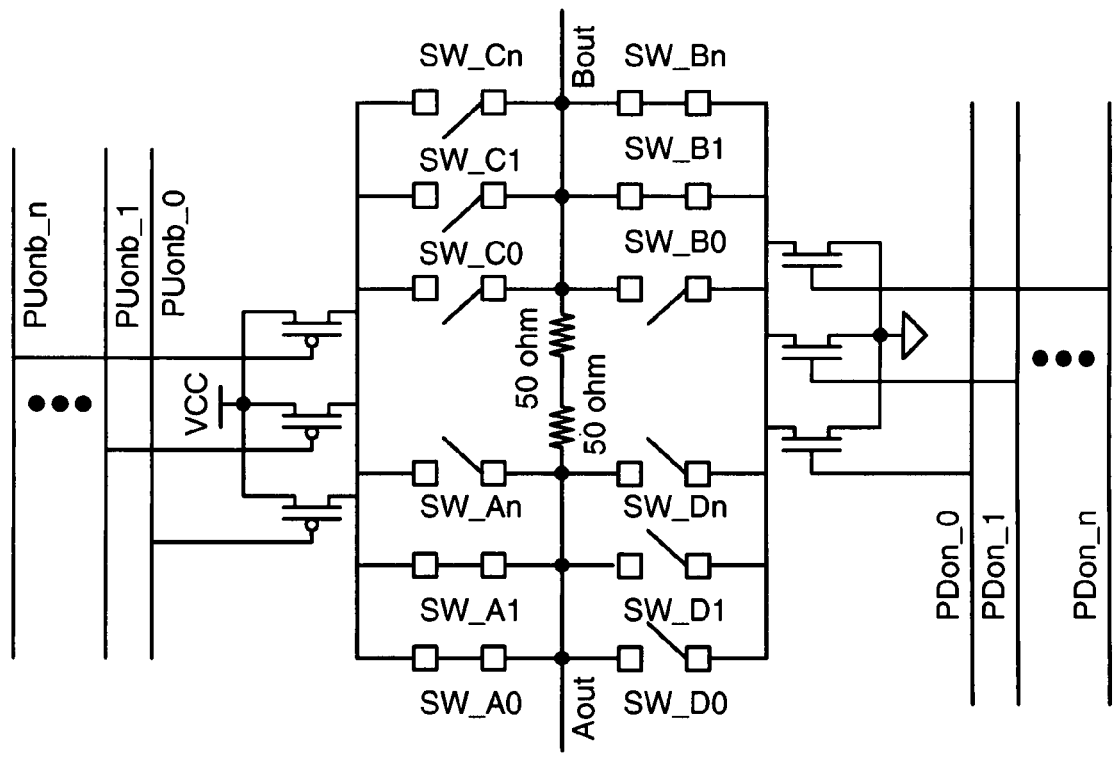
FIG. 6 is a schematic block diagram of another prior art embodiment of an LVDS driver.

The pre-driver circuit 52 converts the level shifted single-ended signal 30-36 into LVDS drive signals 56. The pre-driver circuit 52 provides the LVDS drive signals 56 to the LVDS driver 54. The LVDS driver 54 utilizes the LVDS drive signals 56 in accordance with the $1^{st}$ and $2^{nd}$ global bias signals 28 and 26, to produce the differential signals 38-44. In one embodiment, the pre-driver circuit 52 produces the LVDS drive signals 56 as described with respect to FIG. 2 of the background section.

Figure 13:
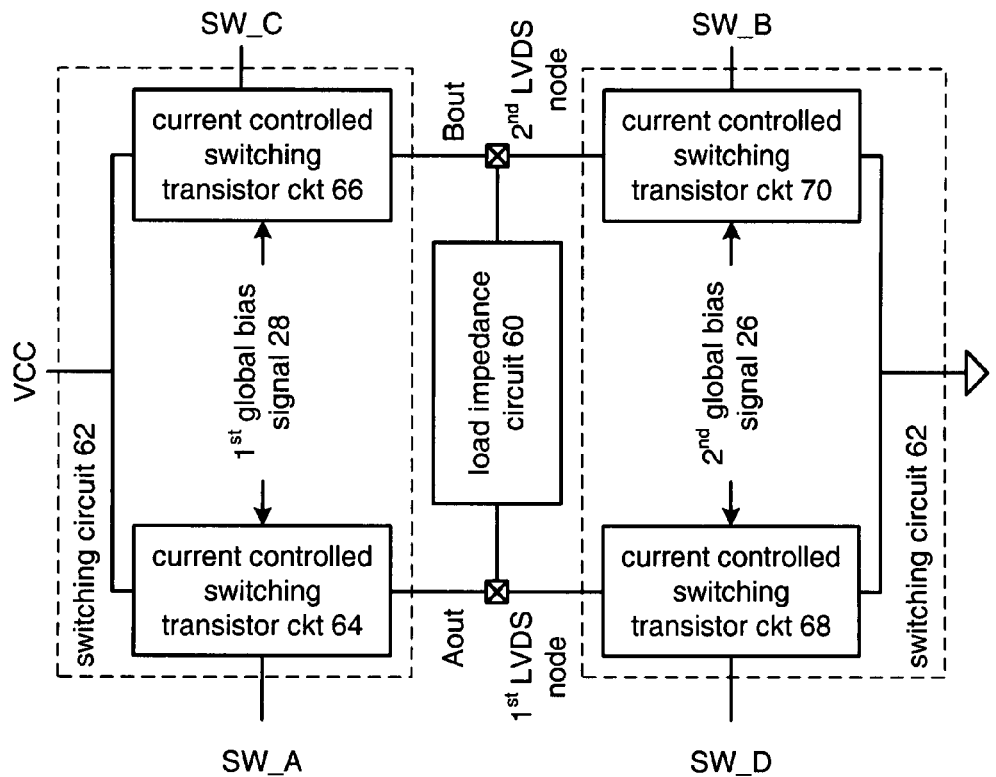
FIG. 13 is a schematic block diagram of an LVDS driver in accordance with the present invention.

FIG. 13 is a schematic block diagram of an embodiment of an LVDS driver 54. In this embodiment, the LVDS driver 54 includes a load impedance circuit 60, switching circuit 62, a $1^{st}$ LVDS node, and a $2^{nd}$ LVDS node. The switching circuit 62 includes a plurality of current controlled switching transistor circuits 64-70. As shown, the current controlled switching circuits 64 and 66 are operably coupled to receive the $1^{st}$ global bias signal 28 while the current controlled switching transistor circuits 68 and 70 are operably coupled to receive the $2^{nd}$ global bias signal 26.

In operation, the LVDS drive signals 56 (SW_A, SW_B, SW_C, SW_D) are provided to the current controlled switching transistor circuits 64-70, respectfully. In addition, the $1^{st}$ global bias signal 28 is coupled to the current controlled switching transistor circuits 64 and 66 and the $2^{nd}$ global bias signal 26 is coupled to the current controlled switching transistor circuits 68 and 70. When SW_A and SW_B are active, current flows through current controlled switching transistor circuit 64, the load impedance circuit 60, and the current controlled switching transistor circuit 70 at a level based on the $1^{st}$ and $2^{nd}$ global bias signals 28 and 26.

The load impedance circuit 60, which will be described in greater detail with reference to FIGS. 14 and 15, provides an impedance such that, based on the regulated current it receives, produces a desired voltage level (e.g., a desired VOD level). In addition to controlling the voltage imposed across the load impedance circuit 60 at output A (Aout) and output B (Bout), the $1^{st}$ and/or $2^{nd}$ global bias signal 28 and/or 26 controls the common mode voltage of the signal imposed across the load impedance circuit 60 (e.g., VOS).

When SW_C and SW_D are active, current flows through the current controlled switching circuit 66, load impedance circuit 60 and current controlled switching transistor circuit 68. Again, the level of current is controlled via the $1^{st}$ and $2^{nd}$ global biasing signals 28 and 26, and the common mode voltage is controlled by at least one of the $1^{st}$ or $2^{nd}$ global bias signals 28 or 26. Accordingly, by adjusting the global bias signals 26 and 28, the voltage (e.g., Vod) imposed across the load impedance circuit 60 may be varied as well as the common mode voltage (e.g., Vos) to accommodate different signaling conventions.

FIG. 14 is a schematic block diagram of the load impedance circuit 60 that includes a 1st gated impedance network 80 and a $2^{nd}$ gated impedance network 82. As shown, the $1^{st}$ and $2^{nd}$ gated impedance networks 80 and 82 are coupled in parallel between the $1^{st}$ and $2^{nd}$ LVDS nodes. When the $1^{st}$ and $2^{nd}$ gated impedance networks 80 and 82 are enabled, via enable signal 94, they provide an impedance for the LVDS driver. In one embodiment, the impedance may be 100 OHMS.

FIG. 15 illustrates a schematic block diagram of a more detailed embodiment of the load impedance circuit 60. In this embodiment, the $1^{st}$ gated impedance network 80 includes a transistor T1 and resistor R1 coupled in series. The $2^{nd}$ gated impedance network 82 includes a resistor R2 and transistor T2 coupled in series. The enable signal 94, which may be produced from a microcontroller, is coupled to the gates of transistors T1 and T2. The series combination of resistor R1 and the impedance of transistor T1 produce a portion of the total impedance of the impedance circuit 60. In one embodiment, the active impedance of transistor T1 and T2 may be 10 OHMS each while the impedance of resistors R1 and R2 may be 190 OHMS each. As such, the series combination of T1 and R1 and R2 and T2 is 200 OHMS producing the overall parallel impedance of 100 OHMS. In this embodiment, a ratio of 1-to-19 is achieved between the transistor resistance versus the poly-resistor resistance. As such, impedance variations due to process variations and temperature variations of the transistor are substantially reduced thereby providing a substantially consistent impedance for the LVDS driver.

FIG. 16 is a schematic block diagram of an embodiment of an LVDS driver 54. In this embodiment, the LVDS driver 54 includes the current controlled switching transistor circuits 64-70, the load impedance circuit 60, a pair of multiplexers 94 and 96 (which may be omitted), and a pair of operational amplifiers 90 and 92. The operational amplifiers 90 and 92 are each operably coupled to receive the $1^{st}$ global bias signal 28 and $2^{nd}$ global bias signal 26, respectively. The inverting input of each of the operational amplifiers 90 and 92 is coupled to a common node between the cascoded transistors. Each of the current controlled switching transistor circuits 64-70 includes a cascode transistor and a switching transistor, which receives the switching input (e.g., SW_A, SW_B, SW_C, and SW_D).

In operation, when the multiplexers are set to provide the output of the amplifiers 90 and 92 to the transistors, the amplifiers 90 and 92 regulate the biasing of the cascode transistors in accordance with the $1^{st}$ and $2^{nd}$ global biasing signals 28 and 26. By regulating the biasing of the cascode transistors, the current is provided to the load impedance circuit 60. When the multiplexers 94 and 96 are in the other state, the differential signaling is off such that the cascode transistors are turned off thereby disabling the LVDS driver.

To provide the regulated current to the load impedance circuit 60, the switching transistors of each of the switching transistor circuits 64-70 is enabled in accordance with the corresponding LVDS drive signals (SW_A, SW_B, SW_C, SW_D). With this implementation, the various signaling conventions may be accurately achieved by adjusting the global biasing signals 26 and 28, which adjusts the bias current of the cascode transistors, while substantially reducing the adverse effects caused by CMOS process and temperature variations and/or noise on VCC and/or ground.

Figure 17:
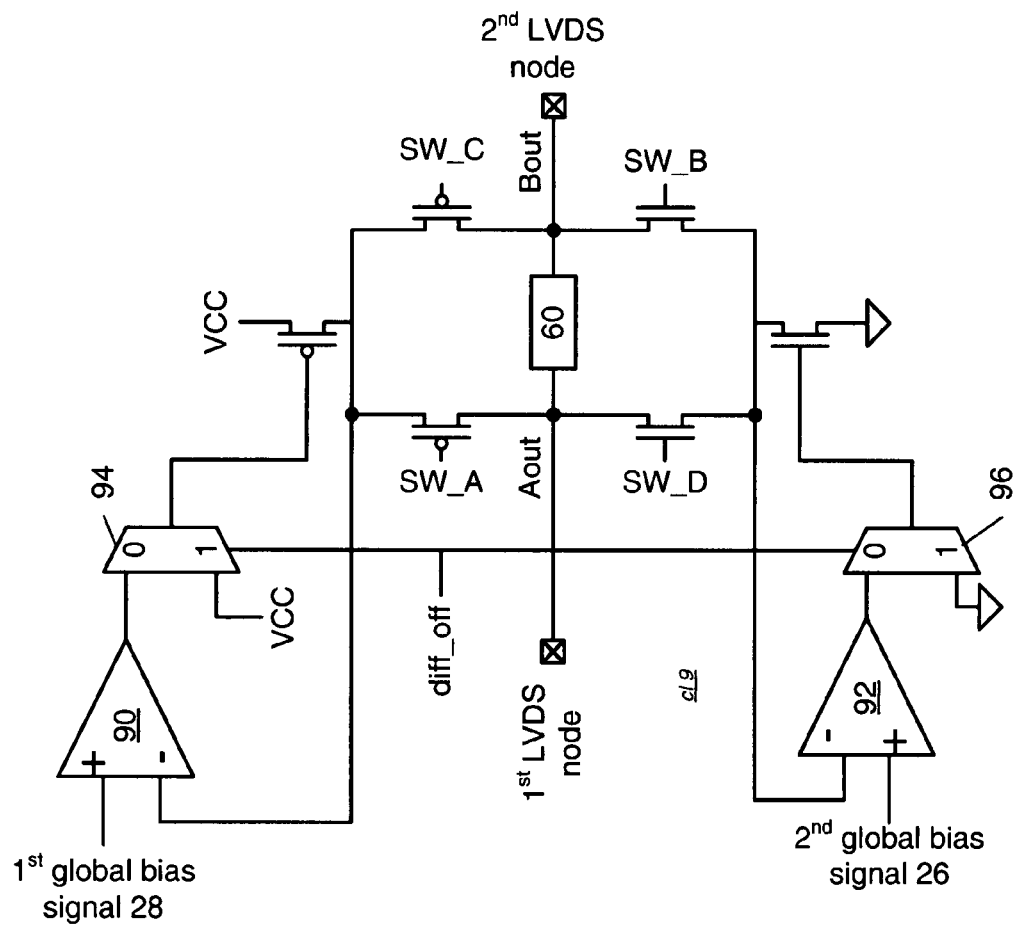
FIG. 17 is a schematic block diagram of yet another embodiment of an LVDS driver in accordance with the present invention.

FIG. 17 illustrates a schematic block diagram of another embodiment of an LVDS driver 54. In this embodiment, a single cascode transistor is used for a pair of switching transistors. Otherwise, the LVDS driver 54 of FIG. 17 operates similarly to the LVDS driver 54 of FIG. 16.

Figure 18:
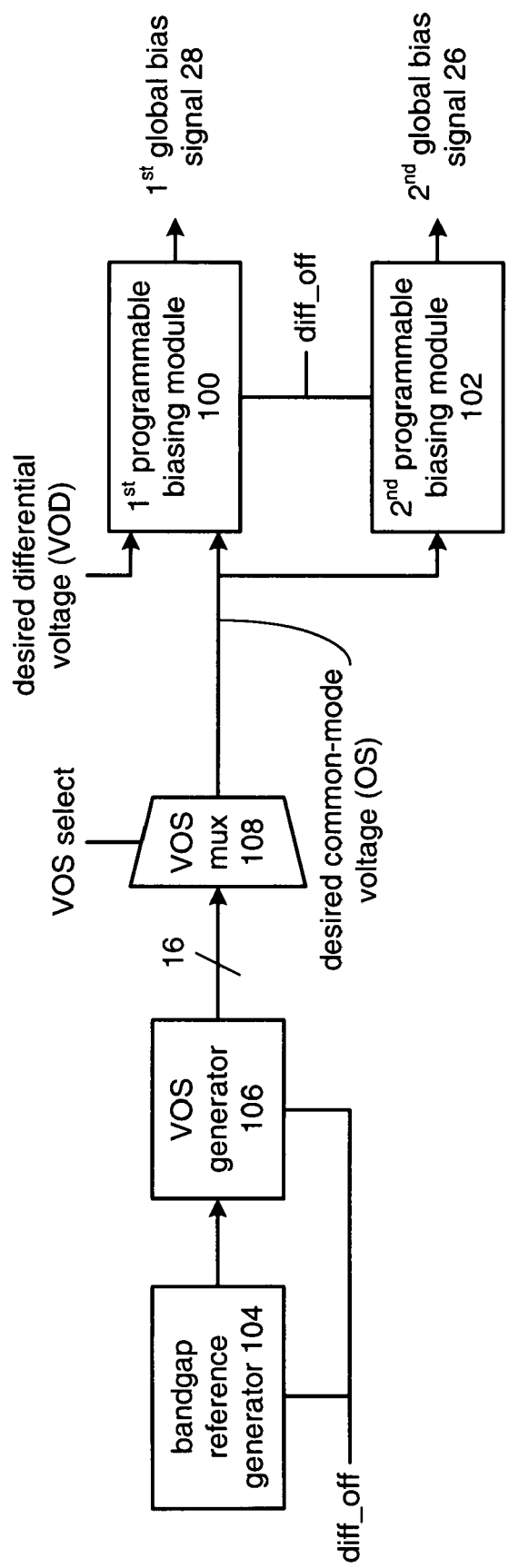
FIG. 18 is a schematic block diagram of a programmable bias generator in accordance with the present invention.

FIG. 18 illustrates a schematic block diagram of the programmable bias generator 12 that includes a bandgap reference generator 104, a VOS generator 106, a VOS multiplexer 108, a $1^{st}$ programmable biasing module 100 and a $2^{nd}$ programmable biasing module 102. The bandgap reference generator 104 and VOS generator 106 are enabled via a differential off signal (DIFF_OFF).

When enabled, the bandgap reference generator 104 produces a bandgap voltage that is provided to the VOS generator 106. The VOS generator 106 generates a plurality of VOS voltages that are provided to the VOS multiplexer 108.

The VOS multiplexer 108 outputs one of the plurality of VOS signals as the desired common mode voltage (OS) based on a VOS select signal, which indicates the particular signaling convention being supported.

The $1^{st}$ programmable biasing module 100 receives the desired common mode voltage (OS) and a desired differential voltage (VOD), which is based on the selected signaling convention, to produce the $1^{st}$ global bias signal 28. The $2^{nd}$ programmable biasing module 102 receives the desired common mode voltage (OS) and produces there from the $2^{nd}$ global bias signal 26. As is further shown, the $1^{st}$ and $2^{nd}$ programmable biasing modules 100 and 102 may be enabled or disabled in accordance with the differential enable signal (DIFF_OFF).

As one of average skill in the art will appreciate, the $1^{st}$ programmable biasing module may be configured to produce the $2^{nd}$ global biasing signal 26 and the $2^{nd}$ programmable biasing module may be configured to produce the $1^{st}$ global biasing signal 28. As illustrated, one of the global biasing signals is based on both the desired differential voltage VOD and the desired common mode voltage while the other is based on the desired common mode voltage.

Figure 19:
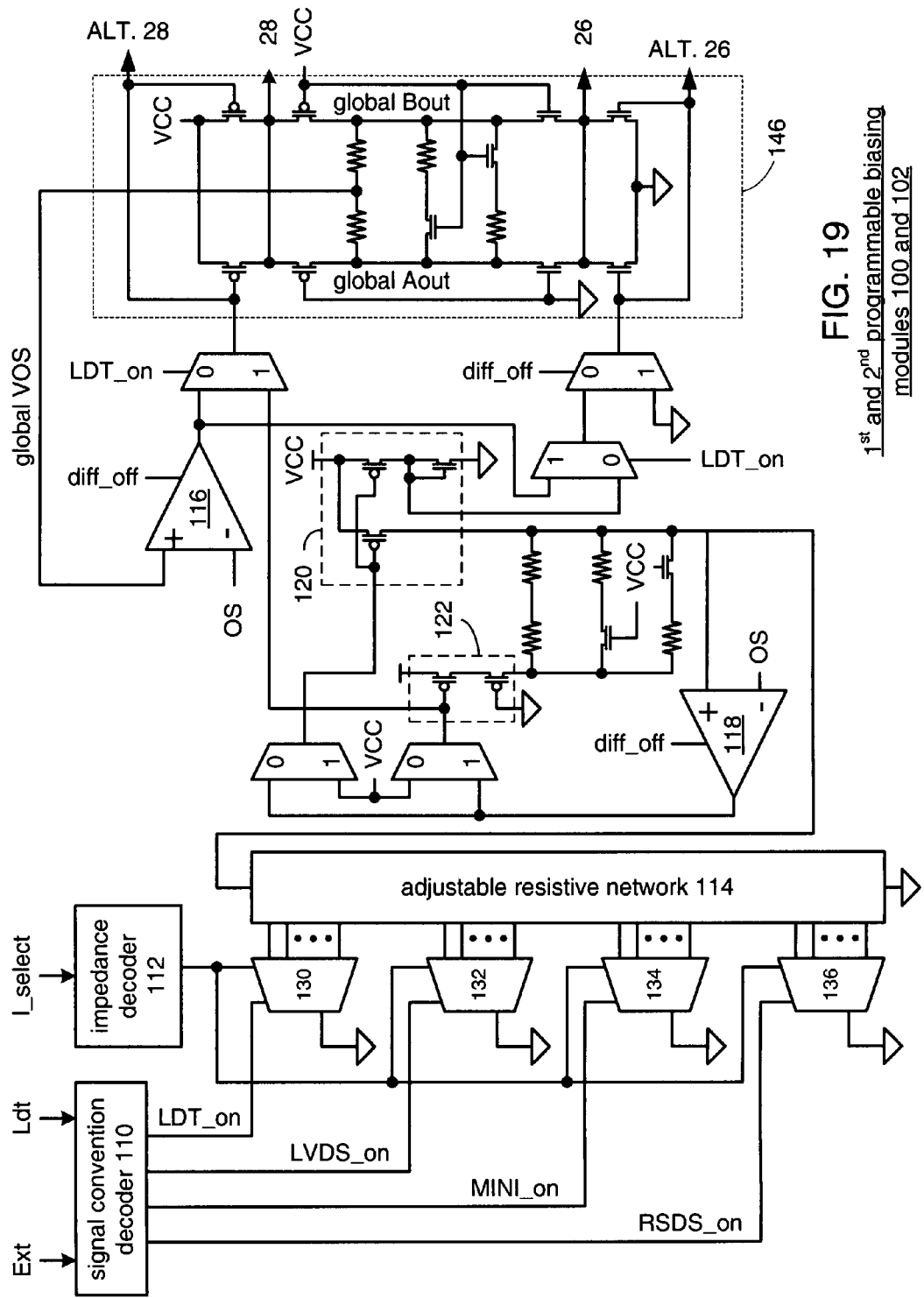
FIG. 19 is a schematic block diagram of the $1^{st}$ and $2^{nd}$ programmable biasing modules in accordance with the present invention.

FIG. 19 illustrates a schematic block diagram of the $1^{st}$ and $2^{nd}$ programmable biasing modules 100 and 102. The programmable biasing modules 100 and 102 collectively include a signal convention decoder 110, an impedance decoder 112, a plurality of multiplexers 130-136, an adjustable resistive network 114, an operational amplifier 118, a $1^{st}$ current mirroring circuit 120, a $2^{nd}$ current mirroring circuit 122, a $2^{nd}$ operational amplifier 116, a plurality of selection multiplexers and a reference LVDS driver 146. The reference LVDS driver includes a plurality of transistors and resistors as shown to produce the global VOS. The $1^{st}$ and $2^{nd}$ global biasing signals 28 and 26 are shown as outputs of the reference LVDS driver. Alternative outputs for the $1^{st}$ and $2^{nd}$ global biasing signals 28 and 26 are also shown.

In operation, based on the EXT signal, LTD signal and current select (I_SELECT) signals, which are based on the particular signaling protocol being selected, the signaling convention decoder 110 and impedance decoder 112 provide signals to the plurality of multiplexers 130-136 to produce the desired impedance structure of the adjustable resistive network 114. The adjustment of the resistive network 114 provides the desired resistance levels for the $1^{st}$ and/or $2^{nd}$ current mirroring circuit 120 and/or 122.

With these parameters set, the biasing of the reference LVDS driver is established such that the $1^{st}$ and $2^{nd}$ global biasing signals 28 and 26 may be generated.

FIG. 20 is a schematic block diagram of another embodiment of a programmable differential signaling system 10. In this embodiment, the programmable differential signaling system 10 includes a plurality of IO modules 150-154, an AND gate 156, the bandgap reference generator 104, the VOS generator 106, a pair of VOS multiplexers 108-1 and 108-2, and a pair of programmable bias generators 12-1 and 12-2. Each of the IO modules 150-154 includes the LV shifter 50, the pre-driver circuit 52 and the LVDS driver, and a pair of multiplexers.

In operation, the pair of programmable bias generators 12-1 and 12-2 each generates a set of global biasing signals 26-1, 28-1, 28-2 and 26-2. With such a configuration, the programmable bias generators 12-1 and 12-2 each serve only three types of signaling conventions. As such, they may be used collectively to service the four, or more, types of signaling conventions discussed with reference to the table in the background section. In this instance, the IO modules can support any two signaling conventions at a given time. For instance, the combinations include both utilizing RSDS where the signal biasing generator 12-1 produces the global biasing signals 28 and 26; all the IO modules could be in accordance with the MINI signaling convention where the programmable bias generator 12-1 produces the biasing signals, which is also the case where all the IO modules are in accordance with the LTD signaling convention. When the signaling convention is in accordance with LVDS, the $2^{nd}$ programmable bias generator 12-2 generates the corresponding biasing signals. When the IO modules are utilizing a combination of signaling conventions the signaling programmable bias generators 12-1 and 12-2 both generate respective global biasing signals wherein the multiplexers within each of the IO modules 150-154 select the appropriate biasing signals such that the IO module operates in accordance with the desired signaling convention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, and zero VT transistors.

The preceding discussion has presented a programmable differential signaling system that accommodates a variety of signaling conventions with consistent and reliable operation. As one of average skill in the art will appreciate, other embodiments may be derived from the teaching of the present invention without deviating from the scope of the claims.

What is claimed is:

1. A low voltage differential signal (LVDS) driver comprises:
   a first LVDS node;
   a second LVDS node;
   a load impedance circuit operably coupled between the first and second LVDS nodes; and
   a switching circuit operably coupled to provide a differential signal at the first and second LVDS nodes in accordance with an input signal, wherein the switching circuit includes a plurality of current controlled switching transistor circuits, each current controlled switching transistor circuit comprising:
      a cascode transistor having an input operably coupled to receive a bias control signal; and
      a switching transistor coupled in series with the cascode transistor, wherein an input of the switching transistor is operably coupled to receive a switching signal in accordance with the input signal;
   a first operational amplifier having a first input, a second input, and an output, wherein the first input of the first operational amplifier is operably coupled to receive a first global biasing signal, the second input of the first operational amplifier is operably coupled to receive a coupling node of the cascode transistor to the switching transistor, and the output of the first operational amplifier provides the bias control signal to a first pairing of the cascode transistor and the switching transistor; and
   a second operational amplifier having a first input, a second input, and an output, wherein the first input of the second operational amplifier is operably coupled to receive a second global biasing signal, the second input of the second operational amplifier is operably coupled to receive a coupling node of the cascode transistor to the switching transistor, and the output of the second operational amplifier provides the bias control signal to a second pairing of the cascode transistor and the switching transistor.

2. The LVDS driver of claim 1, wherein the load impedance circuit comprises:
   a first gated impedance network operably coupled to the first and second LVDS nodes; and
   a second gated impedance network operably coupled in parallel with the first gated impedance, wherein, when active, a parallel combination of the first and second gated impedance networks establishes impedance of the LVDS impedance circuit.

3. The LVDS driver of claim 2, wherein the load impedance circuit comprises:
   the first gated impedance network including a first transistor coupled in series with first a resistor, wherein an input of the first transistor is operably coupled to receive an enable signal; and
   the second gated impedance network including a second transistor coupled in series with a second resistor, wherein an input of the second transistor is operably coupled to receive the enable signal.

4. The LVDS driver of claim 1 further comprises:
   a first multiplexer operably coupled to provide the output of the first operational amplifier as the bias control signal to the first pairing of the cascode transistor and the switching transistor when a differential enable signal is active and to provide power supply rail voltage as the bias control signal to the first pairing of the cascode transistor and the switching transistor when the differential enable signal is inactive; and a second multiplexer operably coupled to provide the output of the second operational amplifier as the bias control signal to the second pairing of the cascode transistor and the switching transistor when the differential enable signal is active and to provide a ground rail voltage as the bias control signal to the second pairing of the cascode transistor and the switching transistor when the differential enable signal is inactive.

* * * * *